United States Patent
Makrides-Saravanos

(10) Patent No.: US 9,971,093 B2
(45) Date of Patent: May 15, 2018

(54) OPTICAL FIBER SPLITTER MODULES

(71) Applicant: Corning Optical Communications LLC, Hickory, NC (US)

(72) Inventor: Elli Makrides-Saravanos, Highland Village, TX (US)

(73) Assignee: Corning Optical Communications LLC, Hickory, NC (US)

(*) Notice: Subject to any disclaimer, the term of this patent is extended or adjusted under 35 U.S.C. 154(b) by 0 days. days.

(21) Appl. No.: 15/251,068

(22) Filed: Aug. 30, 2016

(65) Prior Publication Data
US 2018/0059326 A1    Mar. 1, 2018

(51) Int. Cl.
| | | |
|---|---|---|
| G02B 6/00 | (2006.01) | |
| G02B 6/28 | (2006.01) | |
| G02B 6/30 | (2006.01) | |
| G02B 6/36 | (2006.01) | |
| G02B 6/245 | (2006.01) | |

(52) U.S. Cl.
CPC ............ G02B 6/2808 (2013.01); G02B 6/30 (2013.01); G02B 6/3608 (2013.01); G02B 6/245 (2013.01)

(58) Field of Classification Search
USPC .......................................................... 385/135
See application file for complete search history.

(56) References Cited

U.S. PATENT DOCUMENTS

| | | | |
|---|---|---|---|
| 7,756,382 B2 * | 7/2010 | Saravanos | G02B 6/2804 385/106 |
| 8,180,191 B2 | 5/2012 | Blackwell, Jr. et al. | |
| 8,737,837 B2 | 5/2014 | Conner et al. | |
| 8,867,876 B2 | 10/2014 | Saravanos et al. | |
| 2014/0219621 A1 | 8/2014 | Barnette, Jr. et al. | |

* cited by examiner

*Primary Examiner* — Eric Wong
(74) *Attorney, Agent, or Firm* — Michael E. Carroll, Jr.

(57) ABSTRACT

Optical splitter modules and methods are disclosed. An optical splitter module includes a housing, a splitter chip, a plurality of optical fibers, and a base member. An outer coating of the optical fibers is stripped from the first end such that the first end has a bare portion extending from a fiber end and a stripped portion extending from the bare portion. The second end of each optical fiber has the outer coating with a diameter larger than the diameter of the stripped portion. A connector is coupled to the second end of each optical fiber. A fan-out body surrounds the coating of the optical fibers. The optical fibers are coupled to the surface of the base member such that the fiber end is positioned at the first edge of the base member. The first edge of the base member is coupled to the first edge of the splitter chip.

22 Claims, 5 Drawing Sheets

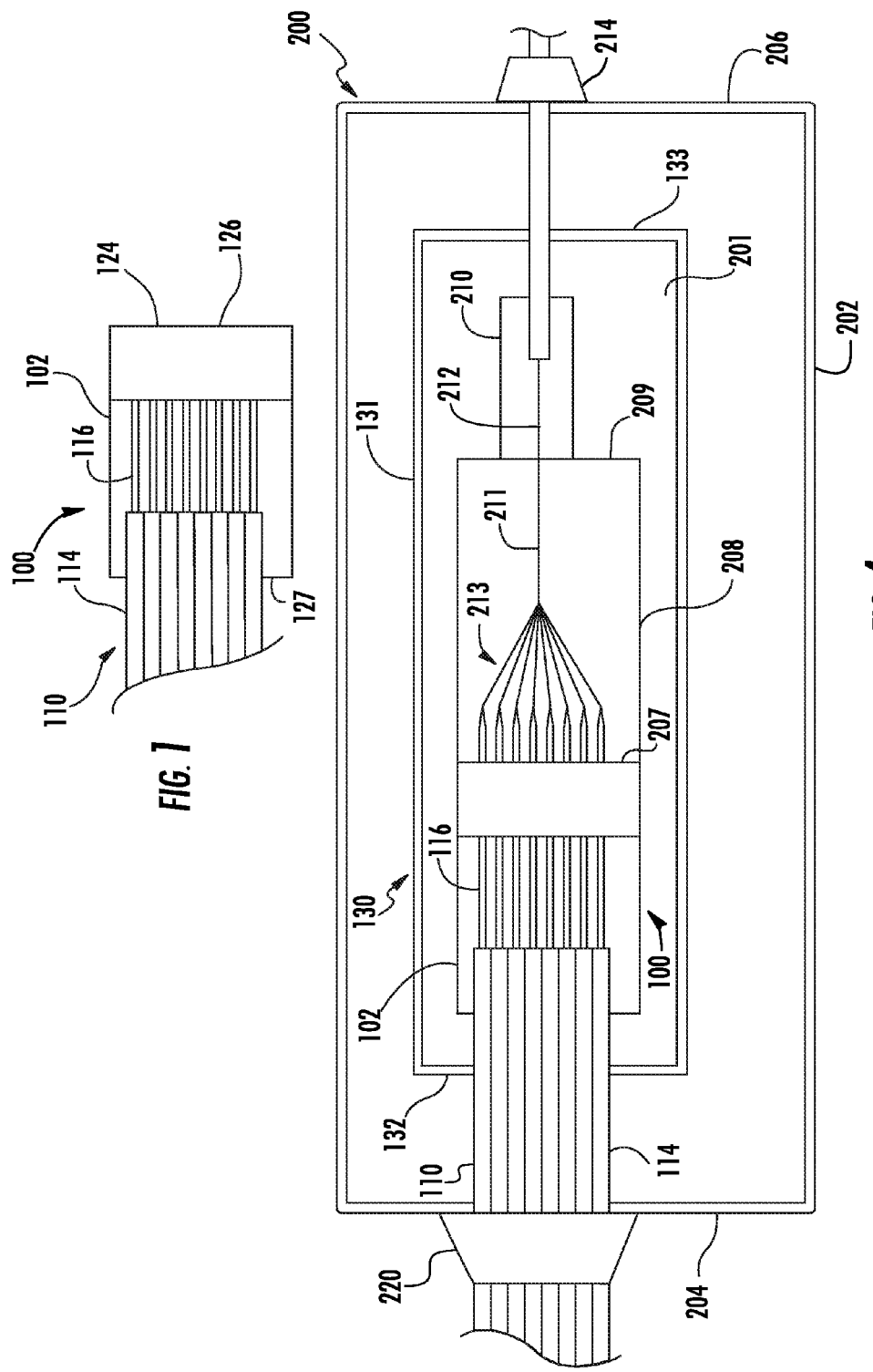

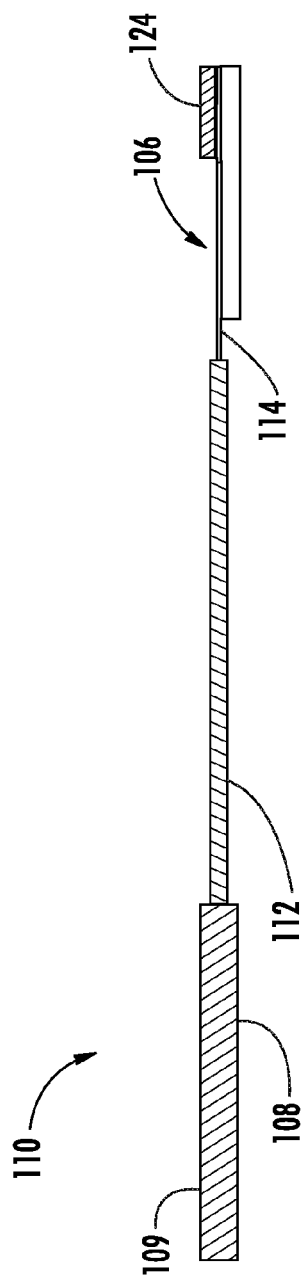
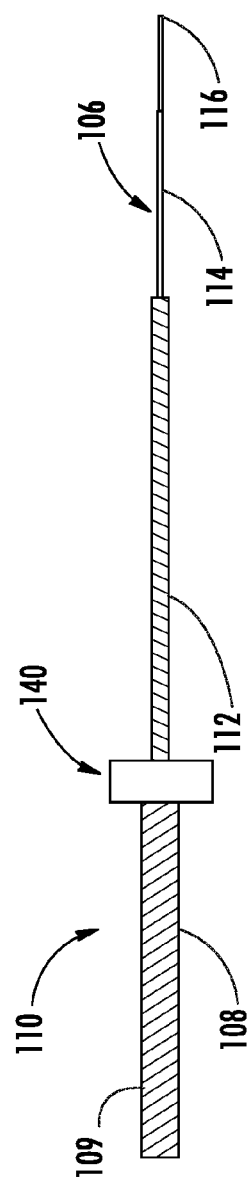

OPTICAL FIBER SPLITTER MODULES

BACKGROUND

Technical Field

The present disclosure generally relates to optical fiber splitter modules and, more particularly, to optical fiber splitter modules having pre-connectorized optical fibers and a reduced size, thereby enabling smaller packaging for products incorporating one or more optical fiber splitter modules.

Technical Background

Optical fiber splitter devices are generally assembled using a simple and cost-effective process employing ribbons of fiber. The optical fiber splitter device typically includes one or more fiber inputs, and multiple fiber outputs assembled in a fiber array using ribbons of fiber. In the final product, the splitter device consists of one or two inputs, generally individual 250-micron fibers or may even be fabricated with 900-micron tight buffer. The assembly of the output fiber array may be based on multiples of 4-fiber or 8-fiber ribbon, for example. Both the input pigtail(s) and output fiber array are aligned with a corresponding planar waveguide (i.e., a splitter chip) and bonded by means of an optical adhesive. This subassembly is then secured inside the housing using an elastomeric potting material.

Such optical fiber splitter devices have been deployed in the outside plant during the last decade for fiber-to-the-premises applications. During this deployment, the reliability of these optical fiber splitter devices has been achieved by installing them inside modules and other types of housings such as multiports, multi-dwelling fiber units, and the like. This practice protects the 250-micron fibers from direct exposure and handling during outdoor applications.

There are two general methods for installation of splitter devices inside modules or other products that can be connectorized to reach individual customer/subscribers: a furcated assembly and a spliced assembly.

In a furcated assembly, individual fibers in the ribbon are separated by the assembly operator and fed through a loose tube, and a connector is subsequently installed at the end of the fiber. This is a labor-intensive process. It also has a yield cost associated with it due to blocked furcation tubes etc. Additionally, during the furcation process it is possible that fibers may occasionally break which results in scrapping the entire splitter device. This process option also requires post-connectorization of the input and output optical fibers, which increases the assembly costs.

A second method of assembly is to splice the optical fibers of the optical fiber splitter device to pre-connectorized pigtails, and then install the assembly inside the housing of the desired product. For this installation, the outputs are separated into single fibers, or, alternatively they can be mass-fusion spliced as ribbons. This process is also time-consuming because each fiber needs to be prepared for splicing. It is also a costly process. In addition, the long-term reliability of splices is low. However, for some cable types (without a furcation option) splicing may be the only currently available option for installing a splitter inside a module.

U.S. Pat. No. 8,867,876 describes a method of making a fiber optic array for attaching to a splitter chip. Optical fibers are stripped and attached to a base member. However, the housing required for enclosing the splitter chip and the fiber optic array described by U.S. Pat. No. 8,867,876 is large because a large diameter portion (900 micron) of the optical fibers is attached to the base member. Connection of the 900 micron diameter fibers at the base member therefore requires a large base member and also a large housing, making the resulting product bulky.

Accordingly, alternative optical fiber splitter devices that do not utilize furcation or optical fiber splitting and have a reduced size are desired.

SUMMARY

Embodiments of the present disclosure are directed to optical splitter devices that have reduced manufacturing costs and improved reliability over current optical splitter devices. Embodiments described herein enable connectorized tight buffered optical fibers to be incorporated directly into an optical splitter device assembly. A connectorized optical fiber array and a splitter chip are incorporated into a single optical fiber splitter device. Connectorized optical fibers may be provided to a splitter manufacturer to be incorporated directly into the optical fiber splitter device manufacturing process of the device assembly.

In one embodiment, an optical splitter module includes a housing having a first end and a second end, a splitter chip, a plurality of optical fibers, a base member, a fan out body, and an input optical fiber. The splitter chip is disposed within the housing, and includes a first edge, a second edge, an input waveguide extending from the second edge, and a plurality of output waveguides optically coupled to the input waveguide and terminating at the first edge. The splitter chip is configured for splitting an optical signal propagating within the input waveguide into a plurality of optical signals propagating within the plurality of output waveguides. The plurality of optical fibers has a first end and a second end. Each optical fiber of the plurality of optical fibers has an outer coating. The outer coating is stripped from the first end of each optical fiber of the plurality of optical fibers such that the first end has a bare portion extending from a fiber end that is free of coatings and a stripped portion extending from the bare portion. A diameter of the stripped portion is between about one and about two times greater than a diameter of the bare portion. The second end of each optical fiber of the plurality of optical fibers has the outer coating thereupon with a diameter larger than the diameter of the stripped portion at the first end. A connector is coupled to the second end of each optical fiber of the plurality of optical fibers. The fan out body is disposed about the plurality of optical fibers such that the outer coating of the plurality of optical fibers extends from a first end of the fan out body. The base member includes a first edge, a second edge, and a surface disposed between the first edge and the second edge. The plurality of optical fibers is coupled to the surface of the base member such that the fiber end at the first end of each optical fiber of the plurality of optical fibers is positioned at the first edge of the base member. The stripped portion of the first end of each optical fiber of the plurality of optical fibers is positioned at, and extends beyond, the second edge of the base member. The first edge of the base member is coupled to the first edge of the splitter chip such that the plurality of optical fibers is optically coupled to the plurality of output waveguides at the first end. The plurality of optical fibers is positioned within the housing such that the stripped portion of each optical fiber of the plurality of optical fibers passes through the first end of the housing. The input optical fiber is coupled to the second edge of the splitter chip such that the input optical fiber is optically coupled to the input waveguide. The input optical fiber passes through the second end of the housing.

In another embodiment, a method of assembling an optical fiber array includes stripping a coating from a first end of each optical fiber of a plurality of optical fibers such that the first end has a bare portion extending from a fiber end that is free of coatings, and a stripped portion extending from the bare portion. A diameter of the stripped portion is between about one and about two times greater than a diameter of the bare portion. The plurality of optical fibers is disposed within a fan out body such that the coating of each optical fiber of the plurality of optical fibers extends from the fan out body in a direction toward the connector. The method further includes disposing the first end of each optical fiber of the plurality of optical fibers on a surface of a base member having a first edge and a second edge such that the fiber end of the first end of each optical fiber of the plurality of optical fibers is positioned at the first edge of the base member and such that the stripped portion is disposed on the surface of the base member and extends beyond the second edge of the base member. The method also includes securing a cover including a plurality of grooves to the surface of the base member such that the bare portion of the plurality of optical fibers is disposed and secured within the plurality of grooves of the cover.

In yet another embodiment, a method of assembling an optical fiber splitter module including an optical fiber array, an input optical fiber, a housing, and a splitter chip includes bonding the optical fiber array to the splitter chip. The splitter chip has a first edge, a second edge, an input waveguide extending from the second edge, and a plurality of output waveguides optically coupled to the input waveguide and terminating at the first edge. The splitter chip is configured for splitting an optical signal propagating within the input waveguide into a plurality of optical signals propagating within the plurality of output waveguides. The optical fiber array includes a plurality of optical fibers having a first end and a second end, and a base member including a first edge, a second edge, and a surface disposed between the first edge and the second edge. Each optical fiber of the plurality of optical fibers has an outer coating. The outer coating is stripped from the first end of each optical fiber of the plurality of optical fibers such that the first end includes a bare portion that is free of coatings and a stripped portion. A diameter of the stripped portion is between about one and about two times greater than a diameter of the bare portion. The second end of each optical fiber of the plurality of optical fibers has the outer coating thereupon with a diameter larger than the diameter of the stripped portion at the first end. The second end of each optical fiber of the plurality of optical fibers includes a connector. The outer coating of the plurality of optical fibers extends from a first end of the fan out body. The plurality of optical fibers is coupled to the surface of the base member such that a fiber end at the first end of each optical fiber of the plurality of optical fibers is positioned at the first edge of the base member, and the stripped portion of the first end of each optical fiber of the plurality of optical fibers is positioned at, and extends beyond, the second edge of the base member. The optical fiber array is bonded to the splitter chip such that the first edge of the base member is bonded to the first edge of the splitter chip, and the plurality of optical fibers is optically coupled to the plurality of output waveguides at the first end. The method further includes bonding the input optical fiber to the second edge of the splitter chip such that the input optical fiber is optically coupled to the input waveguide. The method further includes disposing the optical fiber array and the splitter chip into the housing such that the stripped portion of each optical fiber of the plurality of optical fibers passes through the first end of the housing, and the input optical fiber passes through the second end of the housing.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 schematically depicts a top-down view of an example optical fiber array according to one or more embodiments described and illustrated herein;

FIG. 2 schematically depicts an example stripped end of an optical fiber according to one or more embodiments described and illustrated herein;

FIG. 3 schematically depicts a side view of the example optical fiber array depicted in FIG. 1;

FIG. 4 schematically depicts an example optical splitter device within a module housing of an example splitter module according to one or more embodiments described and illustrated herein;

DETAILED DESCRIPTION

Figure 5:
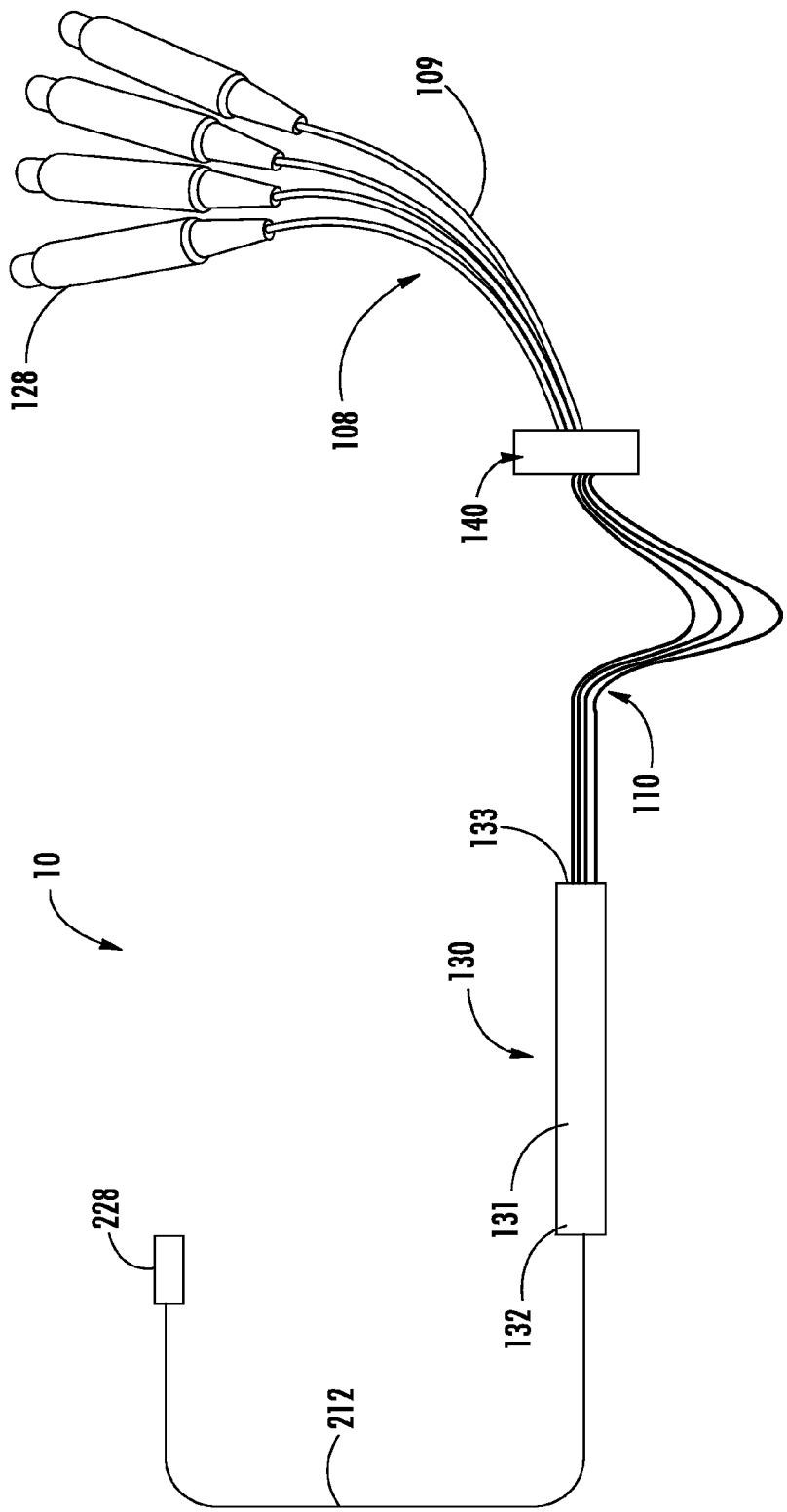
FIG. 5 schematically depicts an optical splitter device having connectorized output optical fibers and a connectorized input optical fiber according to one or more embodiments described and illustrated herein.

Embodiments are directed to optical fiber splitter devices that do not require furcation or the splicing of optical fibers to connectorized optical fibers. Generally, embodiments described herein combine the optical fiber splitter device and a module assembly (e.g., a splitter module, a multiport, and the like) in a single manufacturing process. Embodiments described herein eliminate the need to splice the optical fiber splitter device input and outputs to connectors of the final product (e.g., a splitter module, a multiport, and the like).

The optical fiber splitter devices and methods of fabrication described herein enable a tight buffered optical fiber to be incorporated directly into the splitter device assembly and, therefore, provide improved performance and reliability. Particularly, pre-connectorized optical fiber pigtails or jumpers are directly attached to an optical waveguide splitter (i.e., a splitter chip) without requiring optical fibers to be spliced to separate connectorized optical fiber pigtails or jumpers, and also eliminates the labor-intensive furcation of individual optical fibers and post-connectorization. By directly attaching connectorized optical fiber pigtails or jumpers to the splitter chip, the assembly of the optical fiber splitter device may be completed in a single process by a single manufacturer.

Referring now to FIG. 1, an example optical fiber array 100 is schematically illustrated. The optical fiber array 100 has a base member 102 to which the optical fibers 110 are attached. The base member 102 may be made of glass, but any material suitable for the purpose may be used. The optical fibers 110 have a first end 106 and a second end 108. The second end 108 of the optical fibers 110 have the largest diameter due to the presence of an outer coating 112 or outer jacket 109 (see FIGS. 2, 3 and 5), and in FIGS. 1-5, are buffered optical fibers having an outer diameter of about 0.900 mm. It should be understood that other outer diameters are also possible. As defined herein, the terms "optical fiber" and "optical fibers" include optical waveguides that may or may not have a coating (matrix or otherwise) or a jacket or other coverings or elements that increase the overall diameter thereof. For example, optical fibers would include those optical fibers that are only 125 microns in diameter (i.e., bare optical fibers), as well as those that have been up-jacketed to 900 microns, 2 mm, or greater.

FIG. 2 depicts a non-limiting example of an optical fiber 110. Each optical fiber 110 includes a bare portion 116 and at least one stripped portion at the first end 106. In the illustrated embodiment, the bare portion 116 extends from a fiber end of the optical fiber 110. The bare portion 116 is free of any coatings or layers such that it is exposed optical fiber, such as exposed glass optical fiber. As used herein, the phrase "free of any coatings" means that the portion of the optical fiber has substantially no coatings, jackets, or other elements thereon, and the surface of the optical fiber is exposed. As an example and not a limitation, the bare portion 116 of the optical fibers 110 has a diameter of about 125-127 microns.

However, in the depicted embodiment, the optical fibers 110 are originally presented as 2 mm jacketed fibers 109 at the second end 108 including an outer coating 109, which may then be stripped to 900 micron fibers at stripped portion 112, and then to 250 micron fibers at stripped portion 114, before being stripped to bare optical fibers at bare portion 116 at the first end 106. It should be understood that embodiments are not limited to the example diameters stated above. In one example, the diameter of stripped portion 114 is between about one and about two times greater than a diameter of the bare portion 116, the diameter of stripped portion 112 is greater than the diameter of stripped portion 114, and the diameter of the second end 108 having the outer coating is greater than the diameter of stripped portion 112.

FIG. 3 schematically depicts a side view of the optical fiber array 100 shown in FIG. 1. Referring to both FIGS. 1 and 3, the optical fibers 110 are attached directly to the base member 102. As stated above, the optical fibers 110 are pre-connectorized with optical connectors 128 as shown in FIG. 5. The bare portion 116 of the optical fibers 110 is coupled to the base member 102 such that the end of each optical fiber 110 is disposed at a first edge 126 of the base member 102. The stripped portion 114 of each optical fiber 110 is also attached to the base member 102 of the fiber array 100 such that the stripped portion 114 is positioned at, and extends beyond, a second edge 127 of the base member 102. The optical fibers 110 may be coupled to the base member 102 with an epoxy adhesive, but any adhesive suitable for the purpose may be used. By attaching the optical fibers 110 to the base member 102 such that the stripped portion 114 extends beyond the second edge 127 of the base member 102, a smaller overall optical fiber splitter device is enabled because of the smaller diameter of the optical fibers 110 at the stripped portion 114, as well as the smaller spacing between the optical fibers 110 at the stripped portion 114.

As described in detail below, the optical fibers 110 at stripped portion 114 (which are 250 microns in diameter in one example) are ribbonized and spaced at a distance of about 900 microns or 250 microns in one example. The optical fibers at stripped portion 114 are generally parallel to one another as they step down in size from the 900 micron diameter size to the 250 micron diameter size. The bare optical fibers 116, having been stripped of coatings or matrix at first end 106, are in close proximity to one another due to the ribbonization process mentioned above with a 250-micron pitch (i.e. distance between the centerlines of the optical fibers). These are then aligned and secured within grooves (e.g., v-groove) under a cover plate 124, which may also be made of glass, but may also be made of other suitable materials such as silicon. Accordingly the bare portions 116 of the optical fibers 110 are disposed within grooves of the cover plate 124, which is disposed over at least the bare portions 116. It is also possible that the grooves are part of the base member 102, in which case the cover plate 124 can either be a plate or a grooved plate. In another example, no cover plate is provided. Rather, the bare portions 116 of the optical fibers 110 are disposed directly onto the base member 102. The optical fibers 110 should be parallel to one another at the first end 106 since the first edge 126 of the base member 102 mates with a splitter chip (not shown in FIGS. 1-3).

The first edge 126 of the fiber array 100 is then polished, such as at an 8° angle to allow for an angled physical contact (APC) optical connection with an optical chip, whose edges are also polished at a complementary angle. The optical fibers 110 may be bonded to the base member 102 near the first edge 126 with an adhesive. The optical fibers 110 may be in any format, including an optical fiber ribbon, single loose optical fibers or buffered optical fibers.

Stripped portion 114 of optical fibers 110 extends beyond the second edge 127 of the base member 102. As stated hereinabove, the second end 108 of the optical fibers 110 are pre-connectorized with an appropriate fiber optic connector 128. Providing pre-connectorized optical fibers 110 eliminates the need to later add connectors by splicing the optical fibers of the splitter module. While an SC connector is illustrated, any other suitable type or configuration of fiber optic connector may be used and should be matched to the type and configuration of the optical fibers 110 at the second end 108.

FIG. 4 schematically illustrates a fiber array 100 and a splitter chip 208 disposed within a splitter housing 131 defining an optical fiber splitter device 130. The optical fiber splitter device 130 is disposed within a module housing 202 defining a module 200. Accordingly, the optical fiber splitter device 130 is a device capable of splitting an input optical signal into a plurality of optical signals, and is configured to be disposed within a separate housing, such as the module housing 202 depicted in FIG. 4. The module 200 is configured as the desired product, such as a splitter module, a multiport assembly, and the like.

The splitter chip 208 of the illustrated embodiment is configured as a planar waveguide having a first edge 207, a second edge 209, at least one input waveguide 211 extending from the second edge 209, and plurality of output waveguides 213 optically coupled to the at least one input waveguide 211 and terminating at the first edge 207. As used herein, "optically coupled" means an optical signal is capable of being transmitted from a first component to a second component. The at least one input waveguide 211 and the plurality of output waveguides 213 are capable of guiding optical signals along their respective lengths. The respective waveguides of the splitter chip 208 may be fabricated by any known or yet-to-be-developed process.

As illustrated in FIG. 4, the fiber array 100 is located within an opening 201 of the splitter housing 131 of the optical fiber splitter device 130 between a first end 132 and a second end 133 of the splitter housing 131. The fiber array 100 is attached along first edge 126 to a first edge 207 of the splitter chip 208. The fiber array 100 may be attached to the splitter chip 208 using an adhesive, such as an index matching adhesive having an index of refraction that matches the splitter chip, the optical fibers 110, or both.

The splitter chip 208 is also attached at a second edge 209 to an optical ferrule 210, which allows for optical communication with an input optical fiber 212 entering the optical fiber splitter device 130 at the second end 133 of the splitter housing 131. The input optical fiber 212 may be of any configuration suitable for the purpose. As an example and not a limitation, the input optical fiber 212 may not be attached to the splitter chip 208 by an optical ferrule but rather by a base member as described above with respect to optical fibers 110. It should be understood that more than one input fiber 212 may be provided, and more than one input waveguide 211 and more than one plurality of output waveguides 213 may be disposed within the splitter chip 208.

The splitter housing 131 of the optical fiber splitter device 130 may be filled with a potting compound, for example silicone, to hold the internal components in place and to protect them from contacting the sides 218 of the module housing 202 and from shock and vibration. The optical fiber splitter device 130 is illustrated as being in a generally rectangular configuration, but any suitable configuration may be used, i.e., cube, cylinder, etc.

FIG. 5 schematically illustrates an assembly 10 including the optical fiber splitter device 130 including a connectorized input optical fiber 212 terminated with an input optical connector 228. The input optical connector 228 may be configured as any suitable optical connector. Each optical fiber of the plurality of output optical fibers 110 is connectorized with an output optical connector 128. The output optical connector 128 may be configured as any suitable optical connector.

As shown in the example assembly 10 illustrated in FIG. 5, the second ends 108 of the optical fibers 110 may be disposed within a fan out body 140. The outer coating 109 of the optical fibers 110 enter the fan out body 140 at a first end from a direction of the optical connectors 128. The stripped portion (e.g., stripped portion 112 or stripped portion 114) extends from the second end of the fan out body 140. Alternatively, the outer coating 109 of the optical fibers 110 may extend from the second end of the fan out body 140.

In the example illustrated in FIG. 4, the optical fiber splitter device 130 is disposed within module housing 202 of a module 200. The optical fiber splitter device 130 may be secured within the module housing 202 by a potting compound, such as, without limitation, silicone. As shown in FIG. 4, stripped portion 114 of the plurality of optical fibers 110 passes through an opening within the module housing 202 at a first end 204. As noted hereinabove, the diameter of stripped portion 114 is about one to about two times greater than a diameter of the bare portion of the optical fibers 110. In one non-limiting example, the diameter of stripped portion 114 is about 250 microns. Because the diameter of the stripped portion is much smaller than a diameter of the second end 108 of the optical fibers (e.g., 2 mm), the dimensions of the module 200 may be significantly reduced as compared with modules that require unstripped optical fibers to pass through the housing of the module (e.g., 2 mm unstripped optical fibers).

The optical fibers 110 entering the first end 204 may also be strain relieved by a strain relief member 220. The example strain relief 220 is wider at the first end 204 of module housing 202 and becomes narrower as it extends down the optical fibers 110 and away from module housing 202. However, in some embodiments the strain relief 220 is reversed with the widest point positioned away from the module housing 202. This configuration likewise provides strain relief to the optical fibers 110, but also allows for more variation in the angle that the optical fibers 110 enter the module housing 202.

Figure 6:
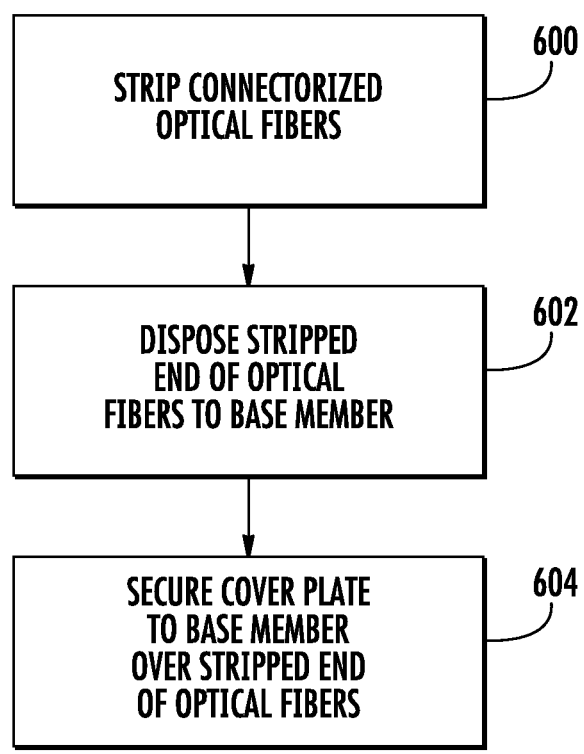
FIG. 6 graphically depicts an example method of assembling an optical fiber array according to one or more embodiments described and illustrated herein.

FIG. 6 illustrates an example method of assembling an optical fiber array. The example method includes stripping a plurality of pre-connectorized optical fibers, such as tight buffered pre-connectorized optical fibers (block 600). As an example and not a limitation, the plurality of pre-connectorized optical fibers may have connectors on the first and second end. These pre-connectorized optical fibers may then be cut in half and stripped as shown in FIGS. 2 and 3. In some embodiments, the cut pre-connectorized optical fibers are assembled in a fan out body 140. The pre-connectorized optical fibers are stripped such that the first end comprises a bare portion extending from a fiber end of the optical fiber that is free of coatings, and a stripped portion extending from the bare portion. As noted hereinabove, a diameter of the stripped portion may be between about one and about two times greater than a diameter of the bare portion, and the optical fibers may be stripped to have additional stripped portions having increasingly greater diameters in a direction away from the first end of the optical fiber.

At block 602, the first end of each optical fiber of the plurality of optical fibers is disposed on a surface of a base member comprising a first edge and a second edge such that the fiber end of the first end of each optical fiber of the plurality of optical fibers is positioned at the first edge of the base member. The stripped portion is disposed on the surface of the base member and extends beyond the second edge of the base member. At block 603, a cover member comprising a plurality of grooves is secured to the surface of the base member such that the bare portion of the plurality of optical fibers is disposed and secured within the plurality of grooves of the cover. The base and cover members may be applied in an alternating sequence.

Figure 7:
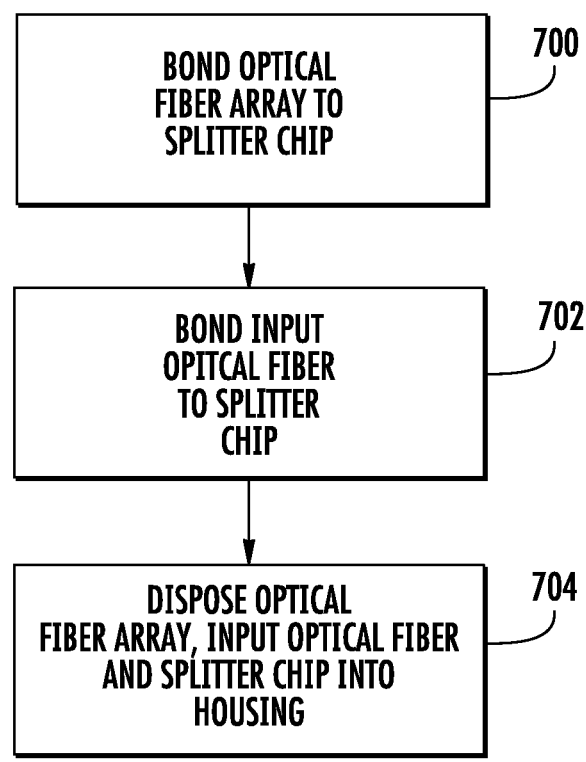
FIG. 7 graphically depicts an example method of assembling an optical fiber splitter device according to one or more embodiments described and illustrated herein.

FIG. 7 illustrates an example method for assembling an optical splitter module is illustrated. At block 700, an optical fiber array is bonded to an optical splitter chip. The optical fiber array 100 and the splitter chip 208 may be configured as described above. The optical fiber array 100 is bonded to the splitter chip 208 such that the first edge 126 of a base member 102 is bonded to a first edge 207 of the splitter chip 208 and the plurality of optical fibers 110 is optically coupled to a plurality of output waveguides 213 of the splitter chip 208. At block 702, an input optical fiber 212 is bonded to a second edge 209 of the splitter chip 208 such that the input optical fiber 212 is optically coupled to an input waveguide 211 of the splitter chip 208. At block 704, the optical fiber array 100, the input optical fiber 212, and the splitter chip 208 are disposed within a splitter housing 131 such that the stripped portion 114 of each optical fiber of the plurality of optical fibers 110 passes through a first end of the splitter housing 131, and the input optical fiber 212 passes through a second end 133 of the splitter housing 131.

It should be understood that embodiments described herein provide for optical splitter modules that have reduced manufacturing costs and improved reliability over current optical splitter modules. In one aspect, a significant cost reduction is achieved by eliminating the need to splice non-connectorized optical fibers of an optical splitter device onto the required type of connectorized pigtails in the final product assembly. The need for expensive fiber cleaving and splicing equipment is eliminated alongside the costly maintenance that is required for this equipment. Further, reliability is significantly improved by eliminating the fiber splices from the final product. Embodiments also eliminate the labor-intensive furcation of individual fibers and post-connectorization.

Embodiments further enable tight buffered optical fibers to be incorporated directly into an optical splitter device assembly, hence, improved performance and reliability. Connectorized optical fibers may be provided to a splitter manufacturer to be incorporated directly into the optical fiber splitter device manufacturing process of the device assembly, i.e., stripping the optical fibers and ribbonizing the 250-micron fiber in preparation of a fiber array, as described above.

Embodiments combine the optical fiber splitter device 130 and the module 200 in a single housing (e.g., module housing 202 shown in FIG. 4). The connectorized optical fiber array that is based on 250-micron fiber in one example is ribbonized and directly assembled to the splitter chip in the factory. This eliminates the splitter housing final assembly and combines the module and optical splitter device in the same process. As such, an additional cost-reduction is achieved by eliminating the need for a final housing step in the construction of the optical splitter device. The naked optical splitter device may be directly installed in the final product housing at the facility of the splitter manufacturer. Due to the elimination of the housing assembly at the optical splitter device level, the actual length of the optical splitter device is shorter and can be installed in a smaller housing for the final product, whether a splitter module or multiport for example. Further, supply chain obstacles are minimized due to the grouping of all of the assembly processes in the same location.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

I claim:

1. An optical fiber splitter module comprising:
a housing having a first end and a second end;
a splitter chip disposed within the housing, the splitter chip comprising a first edge, a second edge, an input waveguide extending from the second edge, and a plurality of output waveguides optically coupled to the input waveguide and terminating at the first edge, wherein the splitter chip is configured for splitting an optical signal propagating within the input waveguide into a plurality of optical signals propagating within the plurality of output waveguides;
a plurality of optical fibers having a first end and a second end, wherein:
each optical fiber of the plurality of optical fibers has an outer coating;
the outer coating is stripped from the first end of each optical fiber of the plurality of optical fibers such that the first end comprises a bare portion extending from a fiber end that is free of coatings and a stripped portion extending from the bare portion;
a diameter of the stripped portion is between about one and about two times greater than a diameter of the bare portion;
the second end of each optical fiber of the plurality of optical fibers has the outer coating thereupon with a diameter larger than the diameter of the stripped portion at the first end; and
a connector is coupled to the second end of each optical fiber of the plurality of optical fibers;
a fan out body disposed about the plurality of optical fibers such that the outer coating of the plurality of optical fibers extends from a first end of the fan out body;
a base member comprising a first edge, a second edge, and a surface disposed between the first edge and the second edge, wherein:
the plurality of optical fibers is coupled to the surface of the base member such that the fiber end at the first end of each optical fiber of the plurality of optical fibers is positioned at the first edge of the base member, and the stripped portion of the first end of each optical fiber of the plurality of optical fibers is positioned at, and extends beyond, the second edge of the base member;
the first edge of the base member is coupled to the first edge of the splitter chip such that the plurality of optical fibers is optically coupled to the plurality of output waveguides at the first end; and
the plurality of optical fibers is positioned within the housing such that the stripped portion of each optical fiber of the plurality of optical fibers passes through the first end of the housing; and
an input optical fiber coupled to the second edge of the splitter chip such that the input optical fiber is optically coupled to the input waveguide, wherein the input optical fiber passes through the second end of the housing.

2. The optical fiber splitter module of claim 1, further comprising a cover plate comprising a plurality of grooves, wherein the cover plate is coupled to the surface of the base member such that the bare portion of the plurality of optical fibers is disposed within the plurality of grooves of the cover plate.

3. The optical fiber splitter module of claim 1, further comprising a connector disposed at an end of the input optical fiber.

4. The optical fiber splitter module of claim 1, further comprising a potting compound encasing the splitter chip within the housing.

5. The optical fiber splitter module of claim 1, wherein the diameter of the bare portion is about 125 microns.

6. The optical fiber splitter module of claim 1, wherein the diameter of the stripped portion is about 250 microns.

7. The optical fiber splitter module of claim 1, wherein the plurality of optical fibers comprises a plurality of tight buffered optical fibers.

8. The optical fiber splitter module of claim 1, wherein the plurality of optical fibers is attached to the surface of the base member using an adhesive.

9. The optical fiber splitter module of claim 1, wherein the fiber end of the first end of the plurality of optical fibers is polished with the first edge of the base member to facilitate an angled physical contact with the first edge of the splitter chip.

10. A method of assembling an optical fiber array, the method comprising:
stripping a coating from a first end of each optical fiber of a plurality of optical fibers such that the first end comprises a bare portion extending from a fiber end that is free of coatings, and a stripped portion extending from the bare portion, wherein:
a second end of each optical fiber of the plurality of optical fibers comprises a connector;
the plurality of optical fibers is disposed within a fan out body such that the coating of each optical fiber of the plurality of optical fibers extends from the fan out body in a direction toward the connector; and
a diameter of the stripped portion is between about one and about two times greater than a diameter of the bare portion;
disposing the first end of each optical fiber of the plurality of optical fibers on a surface of a base member comprising a first edge and a second edge such that the fiber end of the first end of each optical fiber of the plurality of optical fibers is positioned at the first edge of the base member and such that the stripped portion is disposed on the surface of the base member and extends beyond the second edge of the base member; and
securing a cover comprising a plurality of grooves to the surface of the base member such that the bare portion of the plurality of optical fibers is disposed and secured within the plurality of grooves of the cover.

11. The method of claim 10, wherein the first end of each optical fiber of the plurality of optical fibers and the cover is secured to the surface of the base member by an adhesive.

12. The method of claim 10, wherein the plurality of optical fibers comprises a plurality of tight buffered optical fibers.

13. The method of claim 10, further comprising polishing the fiber end of the plurality of optical fibers and the first edge of the base member.

14. A method of assembling an optical fiber splitter module comprising an optical fiber array, an input optical fiber, a housing, and a splitter chip, the method comprising:
bonding the optical fiber array to the splitter chip, wherein:
the splitter chip comprises a first edge, a second edge, an input waveguide extending from the second edge, and a plurality of output waveguides optically coupled to the input waveguide and terminating at the first edge, wherein the splitter chip is configured for splitting an optical signal propagating within the input waveguide into a plurality of optical signals propagating within the plurality of output waveguides;
the optical fiber array comprises a plurality of optical fibers having a first end and a second end, a fan out body and a base member comprising a first edge, a second edge, and a surface disposed between the first edge and the second edge;
each optical fiber optical fiber of the plurality of optical fibers has an outer coating;
the outer coating is stripped from the first end of each optical fiber of the plurality of optical fibers such that the first end comprises a bare portion that is free of coatings and a stripped portion;
a diameter of the stripped portion is between about one and about two times greater than a diameter of the bare portion;
the second end of each optical fiber of the plurality of optical fibers has the outer coating thereupon with a diameter larger than the diameter of the stripped portion at the first end;
the second end of each optical fiber of the plurality of optical fibers comprises a connector;
the outer coating of the plurality of optical fibers extends from a first end of the fan out body;
the plurality of optical fibers is coupled to the surface of the base member such that a fiber end at the first end of each optical fiber of the plurality of optical fibers is positioned at the first edge of the base member, and the stripped portion of the first end of each optical fiber of the plurality of optical fibers is positioned at, and extends beyond, the second edge of the base member; and
the optical fiber array is bonded to the splitter chip such that the first edge of the base member is bonded to the first edge of the splitter chip, and the plurality of optical fibers is optically coupled to the plurality of output waveguides at the first end;
bonding the input optical fiber to the second edge of the splitter chip such that the input optical fiber is optically coupled to the input waveguide; and
disposing the optical fiber array and the splitter chip into the housing such that the stripped portion of each optical fiber of the plurality of optical fibers passes through the first end of the housing, and the input optical fiber passes through the second end of the housing.

15. The method of claim 14, wherein the optical fiber array further comprises a cover plate comprising a plurality of grooves, wherein the cover plate is coupled to the surface of the base member such that the bare portion of the plurality of optical fibers is disposed within the plurality of grooves of the cover plate.

16. The method of claim 14, wherein the optical fiber splitter module further comprises a connector disposed at an end of the input optical fiber.

17. The method of claim 14, further comprising applying a potting compound to encase the splitter chip within the housing.

18. The method of claim 14, wherein the bare portion has a diameter of about 125 microns.

19. The method of claim 14, wherein the stripped portion has a diameter of about 250 microns.

20. The method of claim 14, wherein the plurality of optical fibers comprises a plurality of tight buffered optical fibers.

21. The method of claim 14, wherein the plurality of optical fibers is attached to the surface of the base member using an adhesive.

22. The method of claim 14, wherein the fiber end of the first end of the plurality of optical fibers is polished with the first edge of the base member to facilitate an angled physical contact with the second edge of the splitter chip.

* * * * *

UNITED STATES PATENT AND TRADEMARK OFFICE
CERTIFICATE OF CORRECTION

| | |
|---|---|
| PATENT NO. | : 9,971,093 B2 |
| APPLICATION NO. | : 15/251068 |
| DATED | : May 15, 2018 |
| INVENTOR(S) | : Elli Makrides-Saravanos |

It is certified that error appears in the above-identified patent and that said Letters Patent is hereby corrected as shown below:

On the Title Page

In Column 2, item (57), Abstract, Line 10, delete "fan-out" and insert -- fan out --, therefor.

In the Claims

In Column 12, Line 3, Claim 14, delete "optical fiber optical fiber" and insert -- optical fiber --, therefor.

Signed and Sealed this
Twenty-sixth Day of May, 2020

Andrei Iancu
*Director of the United States Patent and Trademark Office*